United States Patent [19]

MacLeod

[11] 4,166,668

[45] Sep. 4, 1979

[54] FIBER OPTIC ARRANGEMENTS

[75] Inventor: Alexander MacLeod, Leeds, England

[73] Assignee: International Standard Electric Corporation, New York, N.Y.

[21] Appl. No.: 856,070

[22] Filed: Nov. 30, 1977

[30] Foreign Application Priority Data

Dec. 14, 1976 [GB] United Kingdom ............... 52111/76

[51] Int. Cl.² .................................................. G02B 5/14
[52] U.S. Cl. ................... 350/96.20; 350/96.21
[58] Field of Search ................. 350/96.20, 96.21, 96.22

[56] References Cited

U.S. PATENT DOCUMENTS

| 3,982,815 | 9/1976 | Nakayama ................... 350/96.20 X |
| 4,015,894 | 4/1977 | Rocton ................... 350/96.21 |
| 4,065,203 | 12/1977 | Goell et al. ................... 350/96.20 |
| 4,076,376 | 2/1978 | Slaughter ................... 350/96.20 |
| 4,118,100 | 10/1978 | Goell et al. ................... 350/96.20 |

OTHER PUBLICATIONS

"M. A. Bedgood, J. Leach, M. Mathews, "Demountable Connectors for Optical Fiber Systems", Electronics Comm., vol. 51, No. 2, 1976, pp. 85-91.

*Primary Examiner*—Rolf G. Hille
*Attorney, Agent, or Firm*—John T. O'Halloran; Alfred C. Hill

[57] ABSTRACT

A mounting arrangement for a surface-acting solid state device (e.g. a PIN diode, an avalanche diode or an LED) and for coupling the device to an optical fiber transmission line. The arrangement includes a housing for the device header and the end of a jewelled ferrule containing a length of a first optical fiber transmission line. One end of the first transmission line projects from the ferrule and is aligned with the device. The other end of the ferrule mates with a ferrule ended second optical fiber transmission line.

4 Claims, 2 Drawing Figures

FIBER OPTIC ARRANGEMENTS

BACKGROUND OF THE INVENTION

This invention relates to an arrangement for packaging a solid state device and for coupling the device to an optical fiber transmission line. It is applicable to surface-acting devices, e.g. PIN diodes, avalanche diodes, and light emitting diodes (LED). These surface-acting devices can either be for generating light for transmission along an optical fiber transmission line, or for detecting light received via an optical fiber transmission line.

SUMMARY OF THE INVENTION

An object of the present invention is to provide an improved arrangement for packaging a solid state device and for coupling the device to an optical fiber transmission line.

A feature of the present invention is the provision of a mounting arrangement for a surface-acting solid state device and for coupling the device to a first optical fiber transmission line comprising: a sealed enclosure in which the device is mounted in alignment with a ferrule-mounted length of a second optical fiber transmission line, the second line being aligned and coupled to the first line.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
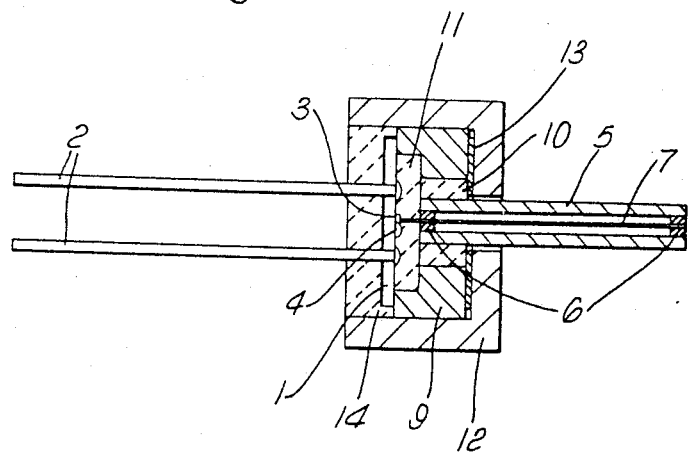
FIG. 1 is a longitudinal cross sectional view of a mounting arrangement in accordance with the principles of the present invention.

The header 1 on which the solid state device is mounted and its connector leads 2 are of conventional construction, i.e. they use glass-to-metal seals or thick film techniques. The essential requirement is that the surface on which the device chip 3 is mounted is flat. The chip 3 and its top contact 4 are also conventionally assembled, e.g. by epoxy or eutectic die bonding, followed by wire bonding.

The package uses a ferrule-mounted fiber for the actual coupling to an optical fiber transmission line. This ferrule 5 has jewels 6 at each of its ends which receive a length of a first optical fiber transmission line 7, a short length of this fiber projecting from the ferrule's inner end, as will be seen below. Prior to insertion into the jewels 6 the fiber 7 is cleaved to obtain an optically good flat face and is then inserted into the jewels 6. The sub-assembly is placed on a fixture (not shown) which sets the extent to which the fiber 7 end projects from that one of the jewels which in the finished product is the inside jewel.

This protection is typically set for a value which corresponds to 0.001 inch greater than the maximum chip thickness. The fiber is then epoxy sealed into the jewels and the non-cleaved end—the right-hand end in FIG. 1—is polished. The ferrule sub-assembly is micro-manipulated over the chip 3 to align the fiber 7 therewith. This alignment may be done visually by passing visible light through the fiber 7 and centering it on the active part of the chip, or by looking for maximum electrical signal when the chip 3 is a light-responsive device.

Assembly is basically in three stages: first the ferrule and the assembled fiber unit 5-6-7 is micro-manipulated for maximum coupling to the chip 3 and temporarily attached. Then silicone or epoxy resin is introduced through one or more of the holes 10 and cured. Finally the sub-assembly is placed in the housing 12 and the front and rear seals 13 and 14 made with epoxy or solder are located as illustrated to seal housing 12.

Figure 2:
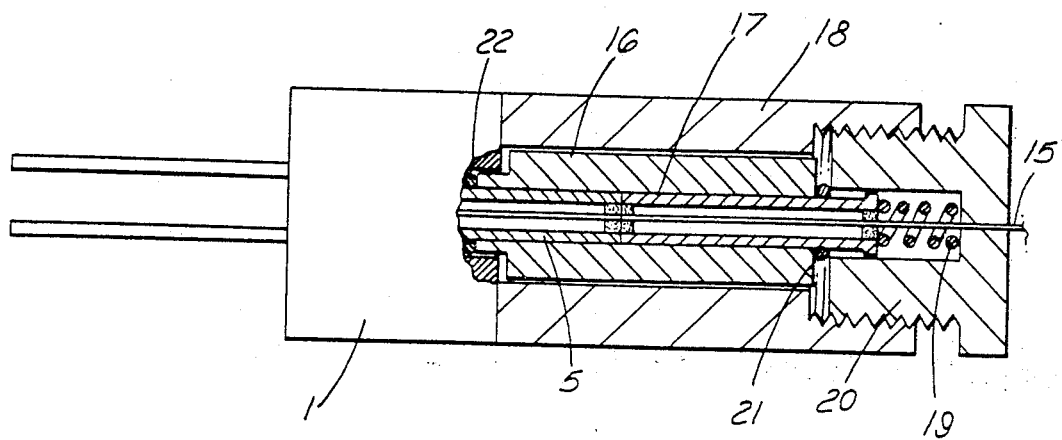
FIG. 2 is a longitudinal cross sectional view showing how the arrangement of FIG. 1 is mated with a fiber optic transmission line in accordance with the principles of the present invention.

FIG. 2 shows how a package 1 such as that of FIG. 1 is coupled to a second fiber optic transmission line 15. A precision-bored metal tube 16 is used to align the ferrule 5 on the package 1, and another ferrule 17 which terminates the line 15. This tube 16 is held in place by a housing 18 which screws onto the package 1. This allows disconnection if it is necessary to clean the fiber window. The tube 16 is a loosefit in the housing 18 so that any eccentricity due to the alignment of the fiber window is taken up.

The fiber transmission line 15, which is terminated by the jewelled ferrule 17, has a spring 19 behind it, which is held by the locking nut 20. When this nut is screwed into the housing, the ferrule 17 is pressed against the package ferrule by spring urgence. The locking nut also compresses the sealing rings 21 and 22 which protect the fiber-fiber joint from the ingress of dust or grit.

Such a package provides a protective seal between the device and its environment, and also allows demountable coupling between the package and a fiber transmission line. The device-fiber alignment is performed during the assembly, thus avoiding alignment operations after the connection of a fiber.

While I have described above the principles of my invention in connection with specific apparatus it is to be clearly understood that this description is made only by way of example and not as a limitation to the scope of my invention as set forth in the objects thereof and in the accompanying claims.

I claim:

1. An arrangement for mounting a surface-acting solid state device and for coupling said device to a first optical fiber transmission line comprising:

a sealed enclosure in which said device is mounted;

a second optical fiber transmission line mounted axially in a first ferrule, said first ferrule extending in a sealed relationship through said enclosure to place said second line in an aligned relationship with said device and to place one end of said second line in a coupled relationship with said device, said first ferrule having a given outer diameter;

a second ferrule supporting axially thereof a portion of said first line, said second ferrule having an outer diameter equal to said given diameter;

a metal tube having a precision bore therein, the inner surface of said bore being in direct, close fitting contact with at least a portion of the outer surface of said first and second ferrules to align said first and second lines and to assist in maintaining the other end of said second line and one end of said portion of said first line in an abutting relationship;

a cylindrical housing disposed about and in a loose fitting relationship with the outer surface of said tube, said housing having one end thereof screwed into said enclosure;

a locking nut disposed coaxial of the other end of said portion of said first line and said second ferrule and screwed into the other end of said housing;

a first sealing ring disposed to provide a seal between said enclosure, said first ferrule and one end of said tube;

a second sealing ring disposed to provide a seal between said locking nut, the other end of said tube and said second ferrule; and a spring disposed coaxial of said other end of said portion of said first line and between the adjacent end of said second ferrule and said locking nut to further assist in maintaining said other end of said second line and said one end of said portion of said first line in said abutting relationship.

2. An arrangement according to claim 1, wherein said device is mounted on a header disposed in said enclosure, said header carrying leads for said device extending through said enclosure, said header being aligned so that a projecting portion of said one end of said second line is adjacent said device.

3. An arrangement according to claim 2, wherein each of said first and second ferrules has a locating jewel at each end thereof to support the associated one of said first and second lines.

4. An arrangement according to claim 1, wherein each of said first and second ferrules has a locating jewel at each end thereof to support the associated one of said first and second lines.

* * * * *